US012193481B2

(12) United States Patent
Li et al.

(10) Patent No.: US 12,193,481 B2
(45) Date of Patent: *Jan. 14, 2025

(54) ELECTRONIC VAPING DEVICE AND CARTRIDGE FOR ELECTRONIC VAPING DEVICE

(71) Applicant: Altria Client Services LLC, Richmond, VA (US)

(72) Inventors: San Li, Midlothian, VA (US); Barry S. Smith, Hopewell, VA (US); Christopher S. Tucker, Midlothian, VA (US)

(73) Assignee: Altria Client Services LLC, Richmond, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/529,666

(22) Filed: Dec. 5, 2023

(65) Prior Publication Data

US 2024/0099365 A1 Mar. 28, 2024

Related U.S. Application Data

(63) Continuation of application No. 17/562,222, filed on Dec. 27, 2021, now Pat. No. 11,849,758, which is a (Continued)

(51) Int. Cl.

*A24F 1/32* (2006.01)
*A24F 40/10* (2020.01)
(Continued)

(52) U.S. Cl.

CPC .............. *A24F 1/32* (2013.01); *A24F 40/485* (2020.01); *H05B 3/44* (2013.01); *A24F 40/10* (2020.01); *H05B 2203/021* (2013.01)

(58) Field of Classification Search

CPC . H05B 3/10; H05B 3/16; H05B 3/026; H05B 3/42; H05B 3/44; H05B 2203/021;
(Continued)

(56) References Cited

U.S. PATENT DOCUMENTS 3,200,819 A 8/1965 Gilbert
3,616,796 A * 11/1971 Jackson ................ A61M 16/16 261/153

(Continued)

FOREIGN PATENT DOCUMENTS

CN 203424292 U 2/2014
DE 202016100917 U1 3/2016

(Continued)

OTHER PUBLICATIONS

International Search Report and Written Opinion in correlation to Patent Application No. PCT/EP2017/057457 dated Jun. 19, 2017.

(Continued)

*Primary Examiner* — Brian W Jennison
(74) *Attorney, Agent, or Firm* — Harness, Dickey & Pierce, P.L.C.

(57) ABSTRACT

A cartridge includes an air flow passageway defining a first airflow direction, a heating element having a longitudinal axis, the longitudinal axis perpendicular to the first airflow direction, and a jacket at least partially surrounding the heating element along the longitudinal axis of the heating element and defining a second airflow direction perpendicular to the first airflow direction.

25 Claims, 4 Drawing Sheets

Related U.S. Application Data continuation of application No. 16/592,099, filed on Oct. 3, 2019, now Pat. No. 11,213,068, which is a continuation of application No. 15/083,443, filed on Mar. 29, 2016, now Pat. No. 10,433,581.

(51) Int. Cl.
*A24F 40/485* (2020.01)
*H05B 3/44* (2006.01)

(58) Field of Classification Search
CPC ........ A24F 1/32; A24F 47/008; A24F 47/004; A24F 40/485
See application file for complete search history.

(56) References Cited

U.S. PATENT DOCUMENTS

| | | | |
|---|---|---|---|
| 4,995,547 A | 2/1991 | Schubert et al. | |
| 8,528,569 B1 | 9/2013 | Newton | |
| 8,678,012 B2 | 3/2014 | Li et al. | |
| 8,689,805 B2 | 4/2014 | Hon | |
| 2009/0260642 A1 | 10/2009 | Monsees et al. | |
| 2010/0307518 A1 | 12/2010 | Wang | |
| 2011/0011396 A1 | 1/2011 | Fang | |
| 2011/0094523 A1* | 4/2011 | Thorens | H05B 1/0244 131/194 |
| 2013/0139833 A1 | 6/2013 | Hon | |
| 2013/0192615 A1 | 8/2013 | Tucker et al. | |
| 2013/0192623 A1* | 8/2013 | Tucker | A61M 15/06 131/329 |
| 2013/0255702 A1 | 10/2013 | Griffith, Jr. et al. | |
| 2014/0109905 A1 | 4/2014 | Yamada et al. | |
| 2014/0209107 A1 | 7/2014 | Liu | |
| 2014/0216450 A1 | 8/2014 | Liu | |
| 2014/0360517 A1 | 12/2014 | Taggart et al. | |
| 2015/0128976 A1 | 5/2015 | Verleur et al. | |
| 2015/0181936 A1 | 7/2015 | Lyubomirskiy et al. | |
| 2015/0208731 A1 | 7/2015 | Malamud et al. | |

FOREIGN PATENT DOCUMENTS

| | | |
|---|---|---|
| EP | 2719416 A1 | 4/2014 |
| EP | 2807935 A1 | 12/2014 |
| EP | 3025598 A1 | 6/2016 |
| RU | 132318 U1 | 9/2013 |
| RU | 2509516 C2 | 3/2014 |
| WO | WO-2017/167828 A1 | 10/2017 |

OTHER PUBLICATIONS

Written Opinion for corresponding Application No. PCT/EP2017/057457 dated Mar. 9, 2018.
Notice of Allowance for Russian Application No. 2018137815 dated May 27, 2020 and English translation.
First Office Action issued Oct. 22, 2020 in Chinese Application No. 201780020336.6.
Notice of Allowance for Japanese Application No. 2018-551100 dated Mar. 3, 2021 and English translation.
Office Action for Chinese Application No. 201780020336.6 dated Mar. 16, 2021 and English translation.
Office Action issued Jun. 18, 2021 in Chinese Application No. 201780020336.6.
Office Action dated Jan. 11, 2022 issued in corresponding Chinese patent application No. 201780020336.6.
Notice of Allowance for Korean Application No. 10-2018-7028080 dated Jun. 23, 2022 and English translation.
Board Opinion issued Mar. 13, 2024 in Chinese Application No. 201780020336.6.
Board Decision issued Jul. 31, 2024 in Chinese Application No. 201780020336.6.

* cited by examiner

Particle Size without Heater Jacket

| | FR (ccm) | D10 (μm) | D50 (μm) | D90 (μm) |
|---|---|---|---|---|
| 1 | 660.0 | 0.2402 | 0.4239 | 0.7345 |
| 2 | 660.9 | 0.2183 | 0.3967 | 0.712 |
| 3 | 661.5 | 0.2364 | 0.3904 | 0.6356 |
| | Avg | 0.232 | 0.404 | 0.694 |

FIG 4a

Particle Size with Heater Jacket

| Sample | FR (ccm) | D10 (μm) | D50 (μm) | D90 (μm) |
|---|---|---|---|---|
| 1 | 660.3 | 0.2071 | 0.4408 | 0.9279 |
| 2 | 661.9 | 0.1979 | 0.4344 | 0.9486 |
| 3 | 659.4 | 0.1932 | 0.4581 | 1.09 |
| | Avg | 0.199 | 0.444 | 0.989 |

FIG 4b

ELECTRONIC VAPING DEVICE AND CARTRIDGE FOR ELECTRONIC VAPING DEVICE

CROSS-REFERENCE TO RELATED APPLICATIONS

This application is a continuation under 35 U.S.C. § 121 of U.S. application Ser. No. 17/562,222, filed Dec. 27, 2021, which is a continuation under 35 U.S.C. § 121 of U.S. application Ser. No. 16/592,099, filed Oct. 3, 2019, which is a continuation of U.S. application Ser. No. 15/083,443, filed Mar. 29, 2016, the entire contents of each of which are incorporated herein by reference.

BACKGROUND

Field

One or more example embodiments relate to electronic vaping devices and/or cartridges for electronic vaping devices.

Description of Related Art

An e-vaping device includes a heater element, which vaporizes a pre-vapor formulation to produce a "vapor." The heater element may include a resistive heater coil, with a wick extending through the resistive heater coil.

The e-vaping device includes a power supply, such as a battery, arranged in the e-vaping device. The battery is electrically connected to the heater, such that the heater heats to a temperature sufficient to convert the pre-vapor formulation to a vapor. The vapor exits the e-vaping device through a mouthpiece including at least one outlet.

SUMMARY

At least one example embodiment relates to an e-vaping device.

Some example embodiments include a power supply section and a cartridge. The cartridge includes at least one inner tube along a length of the cartridge. The inner tube defines a passageway. A heating element is within the inner tube and has a longitudinal axis. A jacket at least partially surrounds the heating element. At least a segment of the jacket is positioned between the heating element and the inner tube along the longitudinal axis of the heating element.

The jacket may be a section of a tube that partially surrounds the heating element or it may completely surround the heating element and have an inlet and an outlet that define an airflow path within the jacket. The air flow path may be substantially transverse to the passageway. The jacket may also be a heat insulator such as fiberglass or a ceramic. The jacket may be a mesh that is permeable, impermeable or semi-permeable and may divert air flow directed toward the heating element.

A wick is in the cartridge and may be in fluid communication with the passageway and at least a portion of the wick may be within the jacket. The heater jacket may partially or completely surround the wick.

At least one example embodiment relates to a cartridge including at least one inner tube along a length of the cartridge. The at least one inner tube may define a passageway. A heating element having a longitudinal axis may be within at least one inner tube. And a jacket may at least partially surround the heating element along the longitudinal axis of the heating element.

In another embodiment, the cartridge includes an air flow passageway defining a first airflow direction, a heating element having a longitudinal axis, the longitudinal axis perpendicular to the first airflow direction, and a jacket at least partially surrounding the heating element along the longitudinal axis of the heating element and defining a second airflow direction perpendicular to the first airflow direction.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Figure 1:
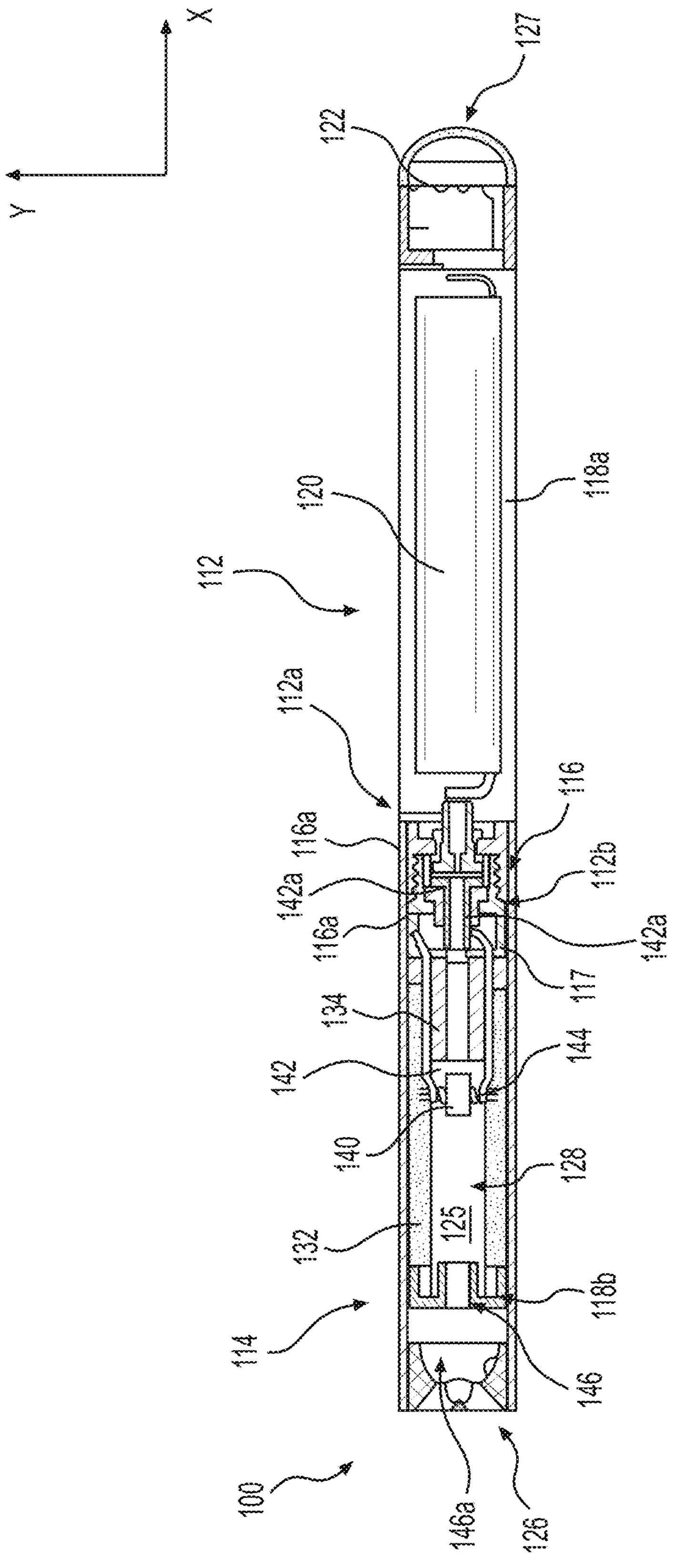
FIG. 1 illustrates an example embodiment of an electronic vaping device including a heater jacket.

FIG. *4a* illustrates a first example particle size distribution table; and

FIG. *4b* illustrates a second example particle size distribution table.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific items, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or items, but do not preclude the presence or addition of one or more other features, integers, steps, operations, elements, items, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, items, regions, layers and/or sections, these elements, items, regions, layers and/or sections should not be limited by these terms. These terms may be only used to distinguish one element, item, region, layer or section from another region, layer or section. Terms such as "first," "second," and other numerical terms when used herein do not imply a sequence or order unless clearly indicated by the context. Thus, a first element, item, region, layer or section discussed below could be termed a second element, item, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIG. 1 generally illustrates an example embodiment of an electronic vaping device including a heater jacket.

With reference to FIG. 1, the example embodiment of an electronic vaping device 100 may include a two-piece configuration including a power supply section 112 and a cartridge 114. The power supply section 112 and the cartridge 114 may be connected to each other via a connector portion 116 at complimentary interfaces 116*a* (first connector) and 116*b* (second connector) of the respective pieces, 112 and 114.

In at least some example embodiments, the interfaces 116*a* and 116*b* may be threaded connectors. However, it should be appreciated that each interface 116*a* and 116*b* may be any type of connector, including a snug-fit, detent, clamp, bayonet, and/or clasp. One or more of the interfaces 116*a* and 116*b* may include a cathode connector, anode connector, some combination thereof, etc. to electrically couple one or more elements of the cartridge 114 to one or more power supplies in the power supply section 112 when the interfaces 116*a* and 116*b* are coupled together.

In some example embodiments, the power supply section 112 and the cartridge 114 may be encompassed by a single housing, e.g., without connectors, housing both the power supply section 112 and the cartridge 114 and the entire electronic vaping device 100 may be disposable.

The power supply section 112 of the electronic vaping device 100 may be a reusable fixture. And the cartridge 114 of the electronic vaping device 100 may be a replaceable fixture.

The power supply section 112 includes a first housing 118*a*, a power supply 120 and a controller 122. The first housing 118*a* encapsulates the power supply 120 and the controller 122. The first housing 118*a* is elongated and has the first interface 116*a* at an end region 112*a* of the first housing 118*a*.

The first housing 118*a* and/or a second housing 118*b* may each have a generally cylindrical cross-section. In other example embodiments, the first and second housing 118*a* and/or 118*b* may each have a generally triangular cross-section or square cross-section. In some example embodiments, the first housing 118*a* may have a greater circumference or dimensions at a tip end 127 than at a mouth-end portion 126 of the electronic vaping device 100 or vice versa.

The power supply 120 is operably connected to a heating element 202 (described in more detail below with reference to FIG. 2) to apply voltage across the heating element 202. The power supply 120 may include a battery arranged in the e-vaping device 100. The power supply 120 may be a Lithium-ion battery or one of its variants, for example a Lithium-ion polymer battery. Alternatively, the power supply 120 may be a nickel-metal hydride battery, a nickel cadmium battery, a lithium-manganese battery, a lithium-cobalt battery or a fuel cell. The e-vaping device 100 may be usable by an adult vaper until the energy in the power supply 120 is depleted or in the case of lithium polymer battery, a minimum voltage cut-off level is achieved.

In at least one example embodiment, the power supply 120 may be rechargeable and may include circuitry configured to allow the battery to be chargeable by an external charging device (not shown). To recharge the e-vaping device 100, a Universal Serial Bus (USB) charger or other suitable charger assembly may be used.

The cartridge 114 includes the second housing 118*b*, an inner tube 125, a mouth-end portion 126, a pre-vapor formulation reservoir 132 for storing or containing a pre-vapor formulation, and a cartridge inlet 134. The inner tube 125 defines a central air passage 128 that is generally coaxially positioned in and with the second housing 118*b*.

The pre-vapor formulation may be a material or combination of materials that may be transformed into a vapor. For example, the pre-vapor formulation may be a liquid, solid and/or gel formulation including, but not limited to, water, beads, solvents, active ingredients, ethanol, plant extracts, natural or artificial flavors, and/or vapor formers such as glycerin and propylene glycol.

The pre-vapor formulation may include nicotine or may exclude nicotine. The pre-vapor formulation may include one or more tobacco flavors. The pre-vapor formulation may include one or more flavors that are separate from one or more tobacco flavors.

In some example embodiments, a pre-vapor formulation that includes nicotine may also include one or more acids. The one or more acids may be one or more of pyruvic acid, formic acid, oxalic acid, glycolic acid, acetic acid, isovaleric acid, valeric acid, propionic acid, octanoic acid, lactic acid, levulinic acid, sorbic acid, malic acid, tartaric acid, succinic acid, citric acid, benzoic acid, oleic acid, aconitic acid, butyric acid, cinnamic acid, decanoic acid, 3,7-dimethyl-6-octenoic acid, 1-glutamic acid, heptanoic acid, hexanoic acid, 3-hexenoic acid, trans-2-hexenoic acid, isobutyric acid, lauric acid, 2-methylbutyric acid, 2-methylvaleric acid, myristic acid, nonanoic acid, palmitic acid, 4-penenoic acid, phenylacetic acid, 3-phenylpropionic acid, hydrochloric acid, phosphoric acid, sulfuric acid and combinations thereof.

The pre-vapor formulation reservoir 132 may include a winding of cotton gauze or other fibrous material about a portion of the cartridge 114. The pre-vapor formulation reservoir 132 may be a fibrous material further including at least one of cotton, polyethylene, polyester, rayon and combinations thereof. The fibers may have a diameter ranging in size from about 6 microns to about 15 microns (e.g., about 8 microns to about 12 microns or about 9 microns to about 11 microns). The storage medium may be a sintered, porous or foamed material. Also, the fibers may be sized to be irrespirable and may have a cross-section that has a Y-shape, cross shape, clover shape or any other suitable shape. In some example embodiments, the pre-vapor formulation reservoir 132 may include a filled tank lacking any storage medium and containing only pre-vapor formulation.

The pre-vapor formulation reservoir 132 may be sized and configured to hold enough pre-vapor formulation such that the e-vaping device 100 may be configured for vaping for at least about 200 seconds. Separate vapings may be referred to as "puffs." The controller of the e-vaping device 100 may be configured to allow each puff to last a maximum of about 5 seconds.

The mouth-end portion 126 is in fluid communication with the central air passage 128 through the interior of inner tube 125, which extends to the second interface **116*b*. The second interface 116*b* is at an end region 112*b* of the cartridge 114. The second interface 116*b* of the cartridge 114 connects to the first connector 116*a* of the power supply section 112**.

The cartridge 114 also includes at least one air inlet 117 in the second housing **118*b* for allowing air into the cartridge 114**.

In at least some example embodiments, the cartridge 114 of the electronic vaping device 100 includes a vaporizer assembly 140. The vaporizer assembly 140 is discussed in more detail below with respect to FIG. 2. The cartridge 114 also includes the heating element 202, a cartridge inlet orifice 142, which defines a cartridge inlet passageway **142*a* (alternatively referred to as an inlet passageway), a wick 144, an outlet seal 146 and an outlet passage 146*a***.

Figure 2:
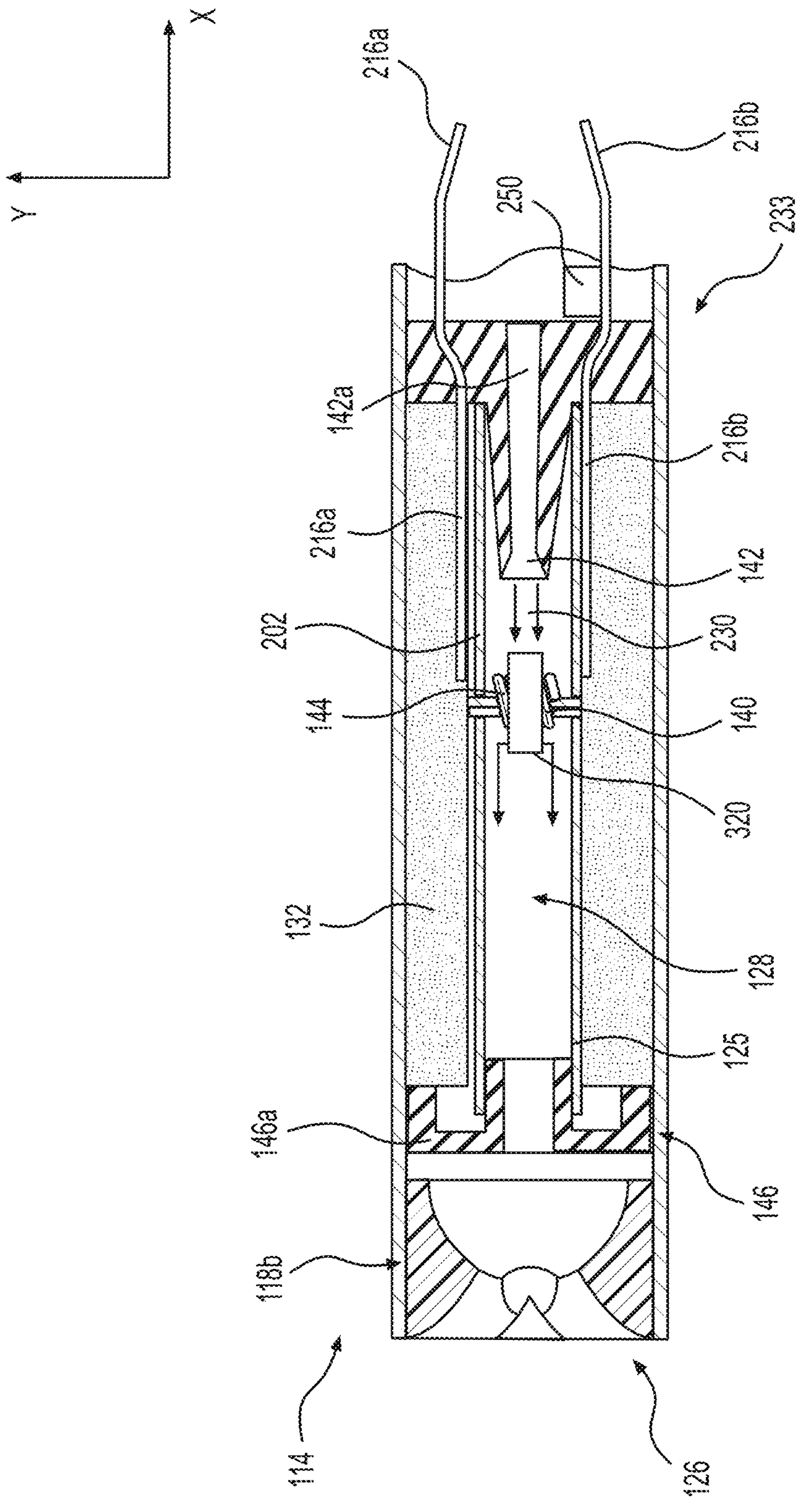
FIG. 2 illustrates an enlarged version of a cartridge of the electronic vaping device of FIG. 1.

FIG. 2 illustrates an enlarged version of the cartridge 114 of the electronic vaping device of FIG. 1.

With reference to FIG. 2, electrodes **216*a* and 216*b* may be provided to electrically couple the heating element 202 to the power supply 120. The heating element 202 may extend in a direction transverse to a longitudinal direction of the cartridge 114. The heating element 202 is arranged generally at a central portion of the inner tube (e.g., entirely between ends of the inner tube 125). The central portion may be mid-way between the ends of the inner tube 125, or can be offset closer to one side of the inner tube 125 or the other. However, in other example embodiments the heating element 202 may be arranged adjacent or directly adjacent to a surface of the inner tube 125**, or in some other location.

In at least one example embodiment, the heating element 202 may be contained in the inner tube 125 and spaced apart from the cartridge inlet orifice 142 between the cartridge inlet 134 and the mouth-end portion 126. The cartridge inlet orifice 142 is an orifice at an end of the passageway **142*a*. The heating element 202** may be in the form of a wire coil, a planar body, a ceramic body, a single wire, a cage or mesh of resistive wire or any other suitable form.

The central air passage 128, through the cartridge 114, provides an airflow path for air passing through the cartridge 114. For example, an inlet end of the central air passage 128 may be in fluid communication with the cartridge inlet orifice 142, and an outlet of the central air passage 128 may be in fluid communication with the mouth-end portion 126.

In at least one example embodiment, the pre-vapor formulation reservoir 132 may be in an outer annulus between the housing **118*b* and the inner tube 125. For example, the pre-vapor formulation reservoir 132 may be sealed at an end closest to the second interface 116*b* by the cartridge inlet 134 at an end opposite the cartridge inlet 134 and by an outlet seal 146. The outlet seal 146 is at an end nearest the mouth-end portion 126 so as to suppress and/or prevent leakage of the pre-vapor formulation from the pre-vapor formulation reservoir 132**.

In one or more other example embodiments, the pre-vapor formulation reservoir 132 may be bound at a first end by the mouth-end portion 126 and at a second end by the second interface **116*b*. A connection between the central air passage 128, the second housing 118*b* and the mouth-end portion 126 may be sealed to be air tight. Similarly, a connection between the central air passage 128, the second housing 118*b* and the second interface 116*b*** may also be sealed to be air tight.

The central air passage 128 may be tubular. The central air passage 128 may have an axis in the elongated (longitudinal) direction that is parallel or substantially parallel to an axis of the second housing **118*b*** in the elongated (longitudinal) direction.

With further reference to FIG. 2, the vaporizer assembly 140 is at least partially positioned within the inner tube 125, arranged generally at a central portion of the inner tube 125 (e.g., between the mouth-end portion 126 and a distal end 233). The central portion may be mid-way between the ends of the inner tube 125, or can be offset closer to one side of the inner tube 125 or the other. The distal end 233 is an end of the cartridge 114 that opposes an end of the cartridge 114 having the mouth-end portion 126.

The vaporizer assembly 140 includes the wick 144, the heating element 202 and the heater jacket 320. The heating element 202 may surround the wick 144. For example, the heating element 202 may be wound about the wick 144 in a spiral-like fashion. The heating element 202 may also be randomly or arbitrarily wrapped around the wick 144 (e.g., the heating element 202 may be zig-zagged or crisscrossed over the wick 144).

In at least this example embodiment, the heating element 202 and the wick 144 are at least partially positioned within the inner tube 125 as part of the vaporizer assembly 140, and are between the cartridge inlet passageway **142*a* and the mouth-end portion 126**.

The wick 144 is in fluid communication with the pre-vapor formulation reservoir 132 such that the wick 144 may dispose pre-vapor formulation in proximate relation to the heating element 202. Each end of the wick 144 may be anchored in the pre-vapor formulation reservoir 132. Pre-vapor formulation from the pre-vapor formulation reservoir 132 is transported to and through the wick 144 via capillary action. As the pre-vapor formulation passes through the wick 144, the pre-vapor formulation is heated by the heating element 202 to produce vapor.

The heater jacket 320 may at least partially surround the heating element 202 to shield the heating element 202 from air flow through the central air passage 128. For example, air enters the cartridge 114 through the cartridge inlet passageway 134 and then passes through the central air passage 128 creating air flow path 230. An amount of airflow across the vaporizer assembly 140 through the central air passage 128 helps transport vaporized pre-vapor formulation to the mouth-end portion 126.

A range of velocities exists for effectively transporting vaporized pre-vapor formulation to the mouth-end portion 126. A non-zero airflow velocity is helpful for at least some transfer of the pre-vapor formulation to the mouth-end portion 126. However, an airflow rate across the vaporizer assembly 140 that is too high may have drawbacks such as: evaporation of the vaporized pre-vapor formulation before reaching the mouth-end portion 126, an increased load on the heating element 202 (and therefore the power supply 120) to produce enough vaporized pre-vapor formulation to keep up with an increased airflow rate, and evaporation of the pre-vapor formulation in the wick 144 before the pre-vapor formulation reaches the vaporizer assembly 140.

Figure 3:
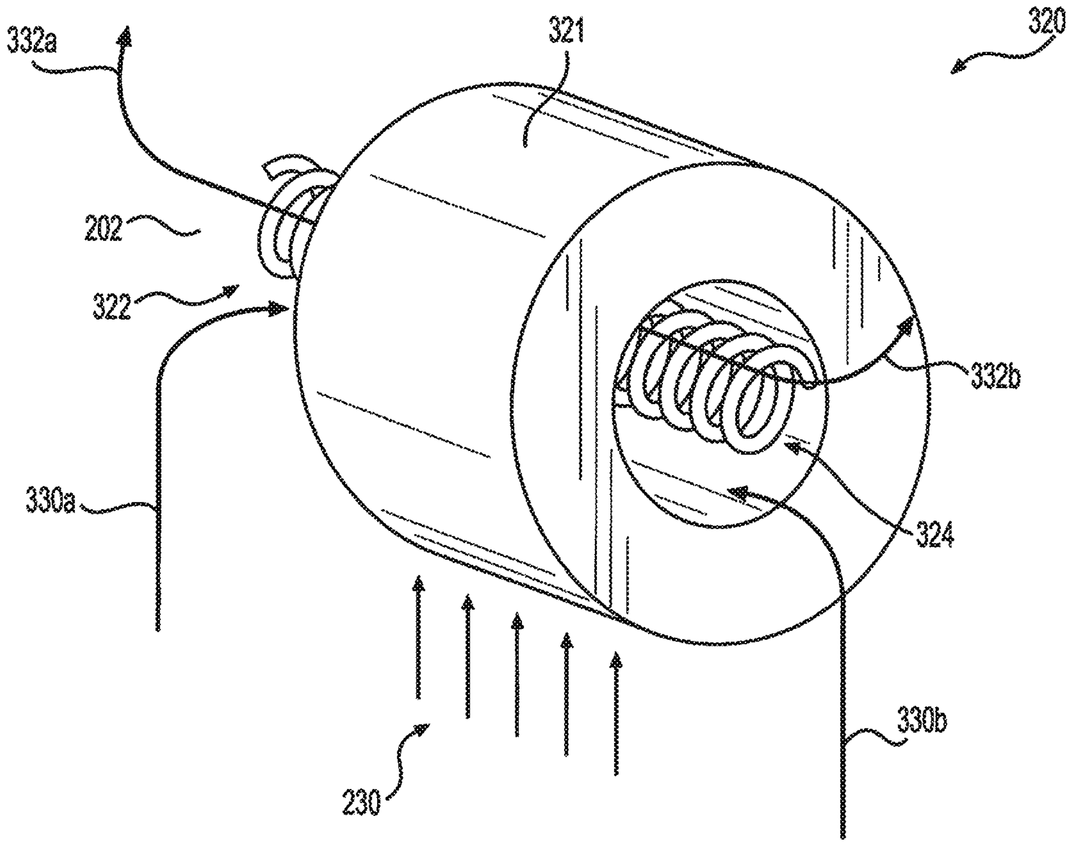
FIG. 3 illustrates an example embodiment of a heater jacket.

FIG. 3 illustrates an example embodiment of a heater jacket.

The heater jacket 320 helps to provide a reduced velocity of air passing over the heating element 202. For example, the heater jacket may have a smaller volume relative to the volume of the central air passage 128. The proportion of the volume of the passage 128 to the volume of the heater jacket 320 may be based on a desired volumetric air flow rate through the heater jacket. Comparatively, an air flow path through the heater jacket may have a smaller cross-sectional area relative to the cross-sectional area of the central air passage 128. Thus, at least two separate air flow volumes are present within the cartridge 114—one inside the heater jacket and one inside the cartridge 114 surrounding heater jacket, with each volume having its own air flow direction that is independent of the other volume.

The volumetric ratio of the central air passage to the heater jacket may be from about 50:1 to about 2:1. The flow ratio may be selected depending on different factors including but not limited to the type of material being used as a heat insulator, permeability of the heater jacket, the size of the heating element relative to the size of the vaporizer assembly, etc.

With reference to FIG. 3, the heater jacket 320 may be cylindrical, tubular, spherical, rectilinear, polygonal, elongated, truncated, cubic or any other suitable configuration. The heater jacket 320 may have a volume that is bound by a continuous outer surface 321 (e.g., a completely closed circular cross-section) and further bound by openings 322 and 324. Alternatively, the heater jacket 320 may have an arcuate cross-section (e.g., an open circular cross-section). Either of the openings 322 and 324 may be an inlet or an outlet. The heater jacket 320 may be formed of impermeable or semi-permeable material. The heater jacket material may be a ceramic, a fiberglass or any insulating materials. The heater jacket may also be made of a combination of these materials.

In one example, the heater jacket 320 may be a mesh material. For example, the heater jacket 320 may be semi-permeable and may include pores. The size of the pores may govern the permeability of the heater jacket 320, e.g., the larger the pores or the higher the number of pores, the more permeable the heater jacket will be.

In example operation of the electronic vaping device 100, which includes the heater jacket 320, the smaller cross-sectional area of the heater jacket 320 may provide a lower volumetric flow rate through the heater jacket 320, at the same or similar air flow rates, relative to the volumetric flow rate through the central air passage 128. The volume of the heater jacket 320 may not allow as much volumetric air flow as through the rest of the central air passage 128 outside of the heater jacket 320.

The heater jacket 320 may reduce the amount of energy needed by the heating element 202 to operate at a particular temperature or range of temperatures. The lower volume of air flow within the heater jacket 320 may reduce the amount of cooling of the heating element 202 during a puff due to air flow contact with the heating element. With less heat loss due to the cooling of the heating element 202, the power supply 120 may not need to work as hard to maintain the heating element 202 at a particular temperature. For example, experiments conducted using a heater jacket according to at least an example embodiment illustrate a reduction in load on a power supply of between 0.5 Watts to 1.5 Watts.

The position of the heater jacket 320 within the cartridge 114 may suppress, block and/or impede air flow to the heating element 202. For example, the heater jacket 320 may be positioned so that the outer surface 321 of the heater jacket 320 is between the cartridge inlet orifice 142 and the heating element 202. As such, in at least one example embodiment, as shown in FIG. 3, wherein the outer surface 321 of the heater jacket 320 is continuous and impermeable, the outer surface 321 acts as a barrier and diverter to air flow directed toward the heating element 202.

The heater jacket 320 may suppress and/or impede airflow to the heating element 202 by redirecting airflow within the central air passage 128. For example, after entering the central air passage 128 through the cartridge inlet 134, air may travel through the central air passage 128 in a substantially axial direction along air flow path 230. Air may enter the heater jacket 320 in directions **330*a* and 330*b* that are transverse or substantially transverse to the air flow path 230. Air may exit the heater jacket 320 in directions 332*a* and 332*b* that are also transverse or substantially transverse to the air flow path 230**.

To maintain airflow across the heating element 202 in a desirable range, the openings 322 and 324 provide access to and from the heating element 202 by air within the central air passage 128. In this case, opening 324 may be an inlet for the heater jacket 320 and the opening 324 may also be an outlet for the heater jacket 320. The heater jacket 320 may have an internal airflow path that is transverse or substantially transverse to the airflow path 230 of the cartridge 114.

Air may enter the heater jacket 320 at opening 322 and air may exit the heater jacket 320 at opening 324. However, airflow is not limited to entering the heater jacket 320 at opening 324 and exiting the airflow jacket at the opening 324. The airflow direction may be reversed.

The electronic vaping device 100 may also include a puff sensor 250 coupled to the controller 122. The puff sensor 250 is operable to sense an air pressure drop and initiate application of voltage from the power supply 120 to the heat element 202. Preferably, the air inlet 117 is located adjacent the puff sensor 250, such that the puff sensor 250 senses air flow indicative of an adult vaper taking a puff and activates the power supply 120.

In at least one example embodiment, the controller 122 may supply power to the heating element 202 responsive to the puff sensor 250. In one example embodiment, the controller 122 may include a maximum, time-period limiter. In another example embodiment, the controller 122 may include a manually operable switch for an adult vaper to initiate a puff. The time-period of the electric current supply to the heating element 202 may be pre-set depending on the amount of pre-vapor formulation desired to be vaporized. In yet another example embodiment, the circuitry may supply power to the heating element 202 as long as the puff sensor 250 detects a pressure drop.

The general direction of the airflow within the heater jacket 320 may be transverse or substantially transverse to the airflow through the central air passage 128 (e.g., airflow through the heater jacket 320 may be in the y-direction as shown in FIG. 2). For example, air within the heater jacket 320 may flow from one of the heater jacket openings 322 or 324 to the other heater jacket opening 324 or 322, respectively. However, the entire flow within the heater jacket 320 is not limited to a direction transverse or substantially transverse to the air flow within the cartridge 114 (e.g., the y-direction) as the airflow may be turbulent, which may cause the airflow within the heater jacket 320 to travel in an infinite number of directions while in the heater jacket 320 (e.g., air flow may swirl within the heater jacket 320). The airflow within the heater jacket 320 may also be laminar or transitional and nonetheless travel in an infinite number of directions inside the heater jacket 320.

The reduced volumetric flow rate of air passing through the heater jacket 320 may produce less dilution of the vapors formed through evaporation of the pre-vapor formulation. Vaporization may thereby be made more efficient.

Operation of the device 100 will now be explained.

When an adult vaper draws upon the mouthpiece portion of the electronic vaping device 100, the puff sensor 250 and controller 122 activate the heating element 202 in accordance with a power cycle. A variety of power cycles are possible; however, for the scope of the present subject matter, no further discussion is necessary. Air enters the electronic vaping device 100 in these embodiments through the air inlet 117, and then is drawn toward the mouth-end portion 126 via the inner tube 125. Thereafter, the vapor produced by the heating element 202 and the wick 144 is mixed with the air and the resultant vapor is drawn through the mouth-end portion 126.

As air is drawn into the electronic vaping device 100 via air inlet 117, a substantial portion of air is diverted and caused to bypass the immediate area of the heating element 202 by the presence and proximity of the heater jacket 320. Vapor formed in regions proximal of the heating element 202 is drawn and mixed with the airflow before being drawn through the mouth-end portion 126.

Pre-vapor formulation is the transferred from the pre-vapor formulation reservoir 132 in proximity of the heating element 202 by capillary action in the wick 144. In one embodiment, the wick 144 has two ends that extend into opposite sides of the pre-vapor formulation reservoir 132 for contact with pre-vapor formulation contained therein. Also preferably, the heating element 202 at least partially surrounds a central portion of the wick 144 such that when the heater is activated, the pre-vapor formulation in the central portion of the wick 144 is vaporized by the heating element 202 to vaporize the pre-vapor formulation and form a vapor.

Preferably, when activated, the heating element 202 heats a portion of the wick 144 surrounded by the heater for less than about 10 seconds, more preferably less than about 7 seconds. Thus, the power cycle (or maximum puff length) can range in period from about 2 seconds to about 10 seconds (e.g., about 3 seconds to about 9 seconds, about 4 seconds to about 8 seconds or about 5 seconds to about 7 seconds).

EXAMPLES

FIG. 4*a* illustrates a first example particle size distribution table. FIG. 4*b* illustrates a second example particle size distribution table. FIG. 4*a* shows particle size distribution without a heater jacket and FIG. 4*b* shows particle size distribution with a heater jacket.

A change in airflow path through the central air passage 128 via the heater jacket 320 may affect particle size of vaporized pre-vapor formulation. For example, FIG. 4*a* illustrates a table showing three airflow rate measurements 1, 2 and 3 (without a heater jacket) of 660.0 cubic centimeters per minute (ccm), 660.9 ccm, and 661.5 ccm, respectively.

In determining particle size distribution of vaporization of a pre-vapor formulation using an e-vaping device without a heater jacket, average distribution of particles was determined to be ten percent (10%) of the particles having a diameter of less than 0.232 micrometers, fifty percent (50%) of the particles having a diameter of less than 0.404 micrometers and ninety percent (90%) of the particles having a diameter of less than 0.694 micrometers.

Comparatively, FIG. 4*b* illustrates a table showing particle size distribution of the cartridge 114 with a heater jacket, according to an example embodiment. For example, FIG. 4*b* shows three airflow rate measurements 1, 2 and 3 (with a heater jacket) of 660.3 cubic centimeters per second (ccm), 661.9 ccm, and 659.4 ccm, respectively. And in determining particle size distribution of vaporization of a pre-vapor formulation using an e-vaping device with a heater jacket, according to an example embodiment, average distribution of particles was determined to be ten percent (10%) of the particles having an average diameter less than about 0.199 micrometers, about fifty percent (50%) of the particles having an average diameter of less than about 0.444 micrometers and about ninety percent (90%) of the particles having an average dimeter of less than about 0.989 micrometers.

In FIGS. 4*a* and 4*b*, the larger particle size distribution experiences an increase with the use of a heater jacket. For example, as air flow to the heating element 202 is slowed or more adequately controlled through the use of a heater jacket, pre-vapor formulation is allowed to vaporize into larger particles. As such, the vaper sensory experience provided by the vaporized pre-vapor formulation particles may be enhanced.

Accordingly, particle size of vaporized pre-vapor formulation may be determined based on the size of the heater jacket 320 and the volume within the heater jacket 320. Moreover, particle size of vaporized pre-vapor formulation may also be determined by the air permeability of the heater jacket.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electronic vaping device, comprising:

a power section; and a cartridge including, an air flow passageway defining a first airflow direction, and a jacket configured to at least partially surround a heating element extending, within the air flow passageway, along a longitudinal axis transverse to the first airflow direction, the jacket configured to partially divert air flow within the jacket to a second airflow direction, the second airflow direction being different from the first airflow direction.

2. The electronic vaping device as recited in claim 1, wherein the jacket is arcuate.

3. The electronic vaping device as recited in claim 1, wherein the jacket is a hollow cylinder.

4. The electronic vaping device as recited in claim 1, wherein the jacket is configured to completely surround the heating element.

5. The electronic vaping device as recited in claim 1, wherein the jacket comprises a heat insulator.

6. The electronic vaping device as recited in claim 5, wherein the heat insulator is air impermeable and comprises fiberglass, ceramic or both fiberglass and ceramic.

7. The electronic vaping device as recited in claim 1, further comprising:

an air inlet in the cartridge; and wherein at least a part of the jacket is between the air inlet and the heating element.

8. The electronic vaping device as recited in claim 1, wherein the jacket comprises an air permeable mesh.

9. The electronic vaping device as recited in claim 1, further comprising:

a reservoir configured to store a pre-vapor formulation; and a wick in fluid communication with the reservoir and the heating element, and wherein the jacket at least partially surrounds a portion of the wick.

10. The electronic vaping device as recited in claim 9, wherein a segment of the wick is surrounded by the heating element.

11. The electronic vaping device as recited in claim 1, further comprising:

the heating element.

12. A cartridge comprising:

an air flow passageway defining a first airflow direction; and a jacket configured to at least partially surround a heating element extending, within the air flow passageway, along a longitudinal axis transverse to the first airflow direction, the jacket configured to partially divert air flow within the jacket to a second airflow direction, the second airflow direction being different from the first airflow direction.

13. The cartridge as recited in claim 12, wherein the jacket is arcuate.

14. The cartridge as recited in claim 12, wherein the jacket is a hollow cylinder.

15. The cartridge as recited in claim 12, wherein the jacket is configured to completely surround the heating element.

16. The cartridge as recited in claim 12, wherein the jacket comprises a heat insulator.

17. The cartridge as recited in claim 16, wherein the heat insulator is air impermeable and comprises fiberglass, ceramic or both fiberglass and ceramic.

18. The cartridge as recited in claim 12, further comprising:

an air inlet in the cartridge; and wherein at least a part of the jacket is between the air inlet and the heating element.

19. The cartridge as recited in claim 12, wherein the jacket comprises an air permeable mesh.

20. The cartridge as recited in claim 12, further comprising:

a reservoir configured to store a pre-vapor formulation; and a wick in fluid communication with the reservoir and the heating element, and wherein the jacket at least partially surrounds a portion of the wick.

21. The cartridge as recited in claim 20, wherein a segment of the wick is surrounded by the heating element.

22. The cartridge as recited in claim 12, further comprising:

the heating element.

23. The electronic vaping device as recited in claim 1, wherein the first airflow direction is between the air flow passageway and the jacket.

24. The electronic vaping device as recited in claim 1, wherein the jacket includes an internal passageway extending along the longitudinal axis and openings on opposite sides of the internal passageway such that the jacket is configured to divert the air flow that enters the openings of the jacket to the second airflow direction.

25. The cartridge as recited in claim 12, wherein the jacket includes an internal passageway extending along the longitudinal axis and openings on opposite sides of the internal passageway such that the jacket is configured to divert the air flow that enters the openings of the jacket to the second airflow direction.

* * * * *